(No Model.)
U. SMITH.
SPECTACLES.
No. 411,971. Patented Oct. 1, 1889.
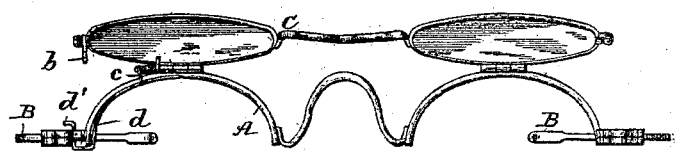
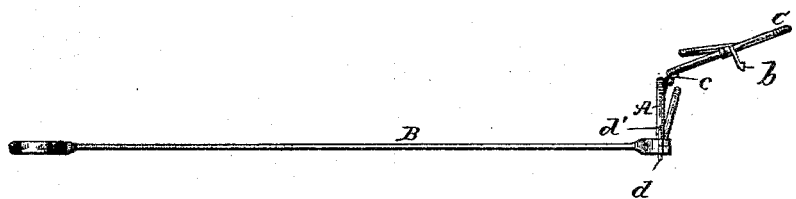
Witnesses
Edwin L Bradford
Wm M Stockbridge
Inventor
Uriah Smith
By his Attorneys
V. D. Stockbridge & Son.

UNITED STATES PATENT OFFICE.

URIAH SMITH, OF BATTLE CREEK, MICHIGAN.

SPECTACLES.

SPECIFICATION forming part of Letters Patent No. 411,971, dated October 1, 1889.

Application filed June 20, 1889. Serial No. 314,912. (No model.)

*To all whom it may concern:*

Be it known that I, URIAH SMITH, a citizen of the United States, and a resident of Battle Creek, Calhoun county, Michigan, have invented certain new and useful Improvements in Spectacles; and I do hereby declare that the following is a full, clear, and exact description of the invention, such as will enable others skilled in the art to which it appertains to make and use the same.

My invention relates to improvements in spectacles, and especially to that class of spectacles which has a movable or swinging frame pivoted to the main frame for adjusting the lenses into and out of range with the eyes. Such spectacles are very desirable, because more or less inconvenience and annoyance arises from looking at persons and objects at a distance through glasses adapted for reading, and under such circumstances it is usual to either remove the spectacles or lift them up on the forehead. This latter operation, though quickly done, is not satisfactory, as the glasses come into contact with the forehead and become clouded from perspiration, and, after all, the spectacles have to be removed from the head and wiped.

My improvements consist in the combination, with a main or primary spectacle-frame and a supplemental swinging frame carrying suitable lenses or shades, of a spring for lifting and holding the supplemental frame out of range of the eye.

It also consists in the combination, with the main frame and a supplemental swinging frame, of a lifting-spring for lifting and holding the swinging frame in its raised position out of range with the eye, and a latch or spring-catch for holding said swinging frame down in its position in front of the eye.

It is a well-known convenience and advantage to have the principal glasses or lenses of spectacles adjustable, so that they may be brought into or thrown out of range with the eyes of the user, as occasion may require, and my invention is intended to render such spectacles more convenient in use than heretofore, and consequently more useful.

In the drawings forming a part of this specification, Figure 1 is a front elevation showing the swinging frame in its raised position, and Fig. 2 is a side elevation also showing the swinging frame in its raised position.

A is the main or primary spectacle-frame, and B B are the bows. The frame A may have rings for lenses, as is usual, or it may be without glasses at all.

C is the adjustable or swinging frame, hinged to the top of the rings of the frame A, as shown. At one or both hinges I provide a light coiled spring $c$, for lifting and holding the movable frame in the raised position shown in Figs. 1 and 2. A light spring $d$, formed with a bend or loop and terminating in a horizontal part $d'$, is attached to the side of a ring of the main frame, and a shouldered part $b$ is attached to the swinging frame. These devices serve as a latch or catch for holding the movable frame in its position in line with the eyes of the user. The part $d'$ serves as a thumb piece or knob for depressing the spring and unlocking the movable frame and permitting it to be thrown up and out of range of the eyes for long-distance sight.

In some instances the movable frame carries shades or colored glasses and are used in connection with ordinary spectacles suitable for the user, or in connection with a main frame without glasses or lenses, as may be desired.

Having now described my invention, I claim—

1. The combination, with a main spectacle-frame and an adjustable swinging frame carrying suitable glasses, of a spring for lifting and holding the swinging frame out of range of the eyes, substantially as described.

2. The combination, with a main frame and an adjustable frame hinged thereto, of a spring for lifting and holding the latter in its raised position, and a latch or catch for holding said adjustable frame in its position in line with the eyes, substantially as described.

In testimony whereof I affix my signature in the presence of two witnesses.

URIAH SMITH.

Witnesses:
W. O. PALMER,
C. L. PALMER.